(12) United States Patent
Maeda

(10) Patent No.: US 8,797,676 B2
(45) Date of Patent: Aug. 5, 2014

(54) PRESSURE-ADJUSTING MECHANISM FOR HARD DISK DRIVE DEVICE

(75) Inventor: Fujio Maeda, Tokyo (JP)

(73) Assignee: NEC Corporation, Tokyo (JP)

(*) Notice: Subject to any disclaimer, the term of this patent is extended or adjusted under 35 U.S.C. 154(b) by 271 days.

(21) Appl. No.: 13/113,459

(22) Filed: May 23, 2011

(65) Prior Publication Data
US 2011/0292542 A1 Dec. 1, 2011

(30) Foreign Application Priority Data
Jun. 1, 2010 (JP) ................................. 2010-126243

(51) Int. Cl.
*G11B 33/14* (2006.01)
(52) U.S. Cl.
USPC ..................................... 360/97.12; 360/99.21
(58) Field of Classification Search
CPC ................................................. G11B 33/1486
USPC ........... 360/97.12, 99.18, 99.19, 99.21, 99.22
See application file for complete search history.

(56) References Cited

U.S. PATENT DOCUMENTS

| | | | |
|---|---|---|---|
| 6,011,666 A * | 1/2000 | Wakamatsu | 360/99.18 |
| 6,317,286 B1 * | 11/2001 | Murphy et al. | 360/97.13 |
| 6,831,811 B1 * | 12/2004 | Andrikowich et al. | 360/99.22 |
| 7,046,469 B2 * | 5/2006 | Tanaka | 360/99.21 |
| 7,420,773 B2 * | 9/2008 | Hatanaka | 360/97.13 |
| 7,570,454 B1 * | 8/2009 | Andrikowich et al. | 360/99.21 |
| 2002/0012279 A1 * | 1/2002 | Angelo et al. | 365/200 |

FOREIGN PATENT DOCUMENTS

| | | | |
|---|---|---|---|
| JP | 62-42720 A | 2/1987 | |
| JP | 5-74129 A | 3/1993 | |
| JP | 2000331458 A | 11/2000 | |
| JP | 2001143462 A * | 5/2001 | G11B 33/14 |
| JP | 2004063029 A * | 2/2004 | G11B 33/12 |
| JP | 2007077958 A | 3/2007 | |

* cited by examiner

Primary Examiner — Craig A. Renner
(74) Attorney, Agent, or Firm — Sughrue Mion, PLLC

(57) ABSTRACT

Provided is a hard disk drive device that can be formed in a small size, which is capable of maintaining the humidity inside the device to the initial manufacture humidity for a long term and capable of adjusting the difference between the pressures of the inside and outside the device. The hard disk drive device includes: a casing formed by an upper housing and a lower housing; and a magnetic disk as well as a magnetic head housed inside the casing. An intake port for adjusting a difference between pressures of inside and outside the casing is provided to the upper housing or the lower housing, and the intake port is sealed by a pressure-adjusting gel-type member from outer side. Further, the pressure-adjusting gel-type member is formed substantially in the same size as the aperture size of the intake port.

8 Claims, 5 Drawing Sheets

PRESSURE-ADJUSTING MECHANISM FOR HARD DISK DRIVE DEVICE

CROSS-REFERENCE TO RELATED APPLICATION

This application is based upon and claims the benefit of priority from Japanese patent application No. 2010-126243, filed on Jun. 1, 2010, the disclosure of which is incorporated herein in its entirety by reference.

BACKGROUND OF THE INVENTION

1. Field of the Invention

The present invention relates to a hard disk drive device used as a small-size storage device for a computer, for example.

2. Description of the Related Art

Conventionally, information is written and read to/from a hard disk (HDD) by a magnetic head and a magnetic disk.

In the HDD, a magnetic head, a magnetic disk, a head positioning mechanism, a spindle motor, and the like are formed with precision mechanism elements. Therefore, it is necessary to prevent intrusions of dust and the like.

Among the conventional HDDs, there is such a type in which a breathing hole having a filter and a gas absorber is provided in a casing in order to overcome a difference between the inside pressure and the outside pressure generated due to an increase in the inside pressure at the time of operation. There is also known a hard disk drive device in a structure that has a screw hole opened through a disk enclosure (HDA).

Further, while HDD-loaded products are conventionally placed under environments where the temperature/humidity are kept to specific values, e.g., in business premises, computer rooms, data centers, etc., such products have come to be placed in various environments (environments where the temperature/humidity exceed the temperature/humidity environment specification for HDD alone) recently in accordance with expansions in the fields using such products. Therefore, there is an increasing risk of deteriorating the long-term reliability of HDD because of a had influence imposed upon the magnetic head, the magnetic disk, etc., due to intrusion of humidity into the inside of the HDD.

Thus, there has been taken a measure by makers of each HDD, such as increasing the constant under humid environments, for example, by employing a labyrinth structure to a breathing hole part which suppresses intrusion of humidity into the inside of the HDD, for example.

As an HDD that is formed not to be affected by the temperature, humidity, and a difference between the inside pressure and outside pressure in case of HDD-loaded product, there is known a closed hard disk which is proposed to prevent dew condensation, generated in a pressure bearing part caused by changes in the humidity, temperature, and the like, to make it possible to stably start up and rotate a spindle motor (see Japanese Unexamined Patent Publication 2000-331458 (Patent Document 1), for example).

The closed hard disk disclosed in Patent Document 1 is formed as a structure in which bellows are provided on one side of a housing so as to absorb the changes in the outside pressure by the bellows.

Further, there is also known a compressor that is capable of securing a sealing property by preventing fixation of an O-ring of a shaft sealing unit for a revolving shaft (see Japanese Unexamined Patent Publication 2007-077958 (Patent Document 2), for example).

In the compressor of Patent Document 2, disclosed is a structure in which a seal member is pressed by a spring structure.

Further, there is known a filter bank device which is proposed so that unfiltered air that passes through a filter bank is not completely leaked (see Japanese Unexamined Patent Publication Sho 62-042720 (Patent Document 3), for example).

In the filter bank device of Patent Document 3, disclosed is a structure capable of being sealed by inserting a gel-type material as a seal member and pressing a filter as illustrated in the drawing.

Furthermore, there is known a hard disk drive device in a structure that is capable of keeping complete airtightness, avoiding deformation of the external structure of a casing, and achieving a secured high reliability (see Japanese Unexamined Patent Publication Hei 05-074129 (Patent Document 4), for example).

In the hard disk drive device of Patent Document 4, disclosed as a second exemplary embodiment is a case where a breathing hole is opened on a top cover. In this case, the breathing hole is covered by a thin-plate in a bellows structure of a required size.

However, with the typical HDD, humidity intrudes inside the HDD from the breathing hole and the screw hole. Therefore, there is a change generated in the initial manufacture humidity set in advance, and the change in the humidity gives a bad influence on the magnetic head, the magnetic disk, and the like. As a result, the long-term reliability of the HDD is deteriorated.

Further, in the closed hard disk disclosed in Patent Document 1, the bellows are provided inside the housing. Thus, the proportion of the bellows becomes large, which is an obstacle to reduce the size of the device. Additionally, since the bellows are provided inside the housing, it is necessary to first remove the cover part from the housing before attaching and detaching the bellows, which is uneasy to do. Also, it is difficult to be used repeatedly.

Further, in the compressor disclosed in Patent Document 2, the seal member is not a gel-type member, and the part to be sealed is also different.

Furthermore, in the filter bank device disclosed in Patent Document 3, a gel-type material is inserted as a seal member. However, the outer circumference of the gel-type material is covered by a seal member holding frame, so that it is not freely detachable.

Furthermore, in the hard disk drive device disclosed in Patent Document 4, the breathing hole is covered by a bellows-structured thin plate formed in a required size. However, the bellows-structured thin plate is provided inside the breathing hole, so that a space for providing the thin plate is necessary. This is an obstacle to reduce the size of the hard disk drive device. The present invention is proposed to overcome each of the above-described issues. It is an exemplary object of the present invention to provide a hard disk drive device formed in a small size, which can keep the humidity inside the drive to the initial manufacture humidity over a long term and adjust the difference between the pressures of the inside and outside the device.

SUMMARY OF THE INVENTION

The hard disk drive device according to an exemplary aspect of the invention is characterized as a hard disk drive device which includes: a casing formed by an upper housing and a lower housing; and a magnetic disk as well as a magnetic head housed inside the casing, wherein an intake port for adjusting a difference between pressures of inside and outside the casing is provided to either the upper housing or the lower housing, and the intake port is sealed by a pressure-adjusting gel-type member from outer side.

BRIEF DESCRIPTION OF THE DRAWINGS

FIGS. 2A and 2B show longitudinal sections of movements of a gel-type member covering an intake port of the first exemplary embodiment according to changes in the pressure, in which FIG. 2A is a state where there is no difference between the pressures of the inside and outside a casing, FIG. 2B is a state where the pressure inside the casing is low.

DETAILED DESCRIPTIONS OF THE PREFERRED EMBODIMENTS

Hereinafter, a hard disk drive device according to the present invention will be described by referring to the accompanying drawings.

Figure 1:
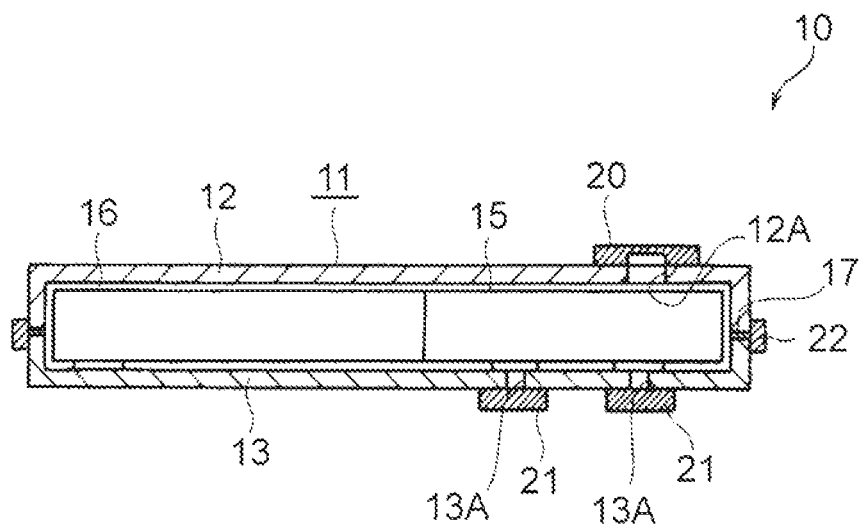
FIG. 1 is a longitudinal section showing a first exemplary embodiment of a hard disk drive device according to the present invention.

FIG. 1 and FIG. 2 show a first exemplary embodiment of a hard disk drive device (simply referred to as a device hereinafter) 10 according to the present invention.

As shown in FIG. 1, the device 10 is formed by including: a casing 11 constituted with an upper housing 12 and a lower housing 13; and a magnetic disk 15 as well as a magnetic head 16 housed inside the casing 11.

Each of the upper housing 12 and the lower housing 13 is formed as a substantially rectangular box. The lower housing 13 forms a bottom part, while the upper housing 13 forms a top cover part.

Further, the magnetic disk 15 and the magnetic head 16 are loaded to the lower housing 13, and a spindle motor and the like, not shown, are loaded to the magnetic head 16.

The both are connected to be unified via a bolt and the like, not shown, by interposing a gasket 17 between the opposing faces thereof.

In the upper housing 12, an intake port 12A of a prescribed diameter for adjusting the difference between the pressures of the inside and outside the casing 11 is provided by being opened through the upper housing 12.

The intake port 12A is sealed by a pressure-adjusting gel-type member 20 as shown in FIG. 2 in details. The pressure-adjusting gel-type member 20 is formed into a recessed shape in its sectional view by using a columnar member.

That is, the recessed shape is formed with a thick-plate circumference fixing part 20A and a thin-plate pressure adjusting part 20B formed on one end of the circumference fixing part 20A. The circumference fixing part 20A is fixed to the circumference of the fringe part of the intake port 12A to cover thereover. Further, the inside diameter of the recessed part 20C of the pressure-adjusting gel-type member 20 is formed to be substantially in the same size as the inside diameter of the intake port 12A.

Note here that the gel-type member refers to colloid particles that are semi-solidified or solidified because a dispersion system having a liquid as a dispersion medium loses its fluidity. In this exemplary embodiment, used as the gel-type member is a type that is excellent in the elasticity, the durability, the oil resistance, the chemical resistance, and exhibits the viscosity of a prescribed strength. For example, acryl-based or urethane-based elastic rubber-type gel material is used.

The pressure-adjusting gel-type member 20 has the viscosity and is glued by using own adhesiveness, so that it is easy to be attached and detached to/from the upper housing 12. This makes it possible to use the pressure-adjusting gel-type member 20 repeatedly.

The place for providing the intake port 12A and the pressure-adjusting gel-type member 20 is not limited only to the upper housing 12. The port 12A and the member 20 may be provided to the lower housing 13. Also, a plurality of those may be provided as well.

Returning to FIG. 1, screw holes 13A, 13A opened through a disk enclosure (HDD) inside the casing 11 are provided to the lower housing 13.

Those screw holes 13A, 13A are sealed from the outer side by sealing gel-type members 21, 21 formed with a gel-type member of a same material as that of the pressure-adjusting gel-type member 20. The sealing gel-type members 21, 21 are formed to have the outside diameters greater than the screw holes 13A, 13A, with a prescribed thick size. The sealing gel-type members 21, 21 are also glued by utilizing the viscosity, so that it is easy to be attached and detached to/from the lower housing 13. This makes it possible to use the sealing gel-type members 21, 21 repeatedly.

Further, a sealing gel-type member 22 is provided at a part of the gasket 17 interposed between the dividing face of the upper housing 12 and the lower housing 13 to seal the gap therebetween. The gasket 17 is provided along the dividing face between the substantially rectangular upper housing 12 and lower housing 13, so that it is in a thin-plate rectangular ring shape formed in a width of the opposing faces of each of the housings 12 and 13.

Therefore, the sealing gel-type member 22 is formed to be in contact with the circumference of the rectangular ring-shape gasket 17, and formed to be in a thick-plate rectangular ring shape.

Further, the sealing gel-type member 22 is formed with a gel-type member of a same material as that of each of the gel-type members 21, 21 and also glued by utilizing the viscosity, so that it is easy to be attached and detached to/from the dividing face. This makes it possible to use the sealing gel-type member 22 repeatedly.

Next, by referring to FIG. 2, described are fluctuation states of the thin-plate pressure adjusting part 20B of the pressure-adjusting gel-type member 20, when there is a difference between the pressures of the inside and outside the casing 11.

Figure 2A:
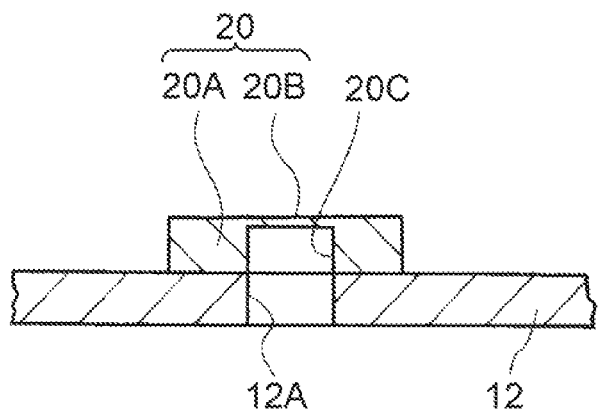

As shown in FIG. 2A, in a case where there is no difference between the pressures of the inside and outside the casing 11, the pressure adjusting part 20B keeps the level state.

Figure 2B:
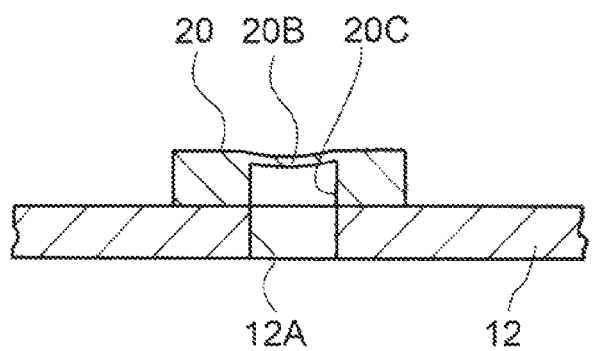
Figure 2C:
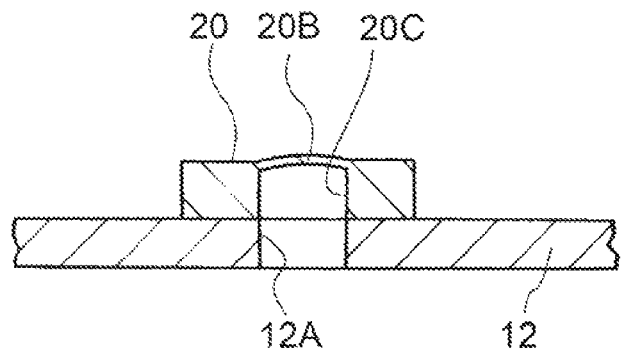
FIG. 2C is a state where the pressure inside the casing is high.

In the meantime, in a case where the pressure inside the casing 11 becomes lower, the pressure adjusting part 20B becomes depressed as in FIG. 2B. Inversely, in a case where the pressure inside the casing 11 becomes higher, the pressure adjusting part 20B becomes swollen towards the outer side as in FIG. 2C.

As described, changes in the pressure of the inside the casing 11 can be absorbed when the pressure-adjusting part 20B of the pressure-adjusting gel-type member 20 changes its shape.

With the device 10 structured in the manner described above, following effects can be achieved.

(1) The intake port 12A is sealed by the pressure-adjusting gel-type member 20 from the outer side, so that it is possible to prevent intrusion of the humidity from the intake port 12A. Thus, the humidity inside the casing 11 can be maintained to the initial manufacture humidity over a long term, thereby making it possible to extend the life of the device 10.

(2) The intake port 12A is sealed by the pressure-adjusting gel-type member 20 from the outer side, and the pressure-adjusting gel-type member 20 has the flexibility. Particularly, the pressure adjusting part 20B is formed in a thin plate, so that the pressure-adjusting part 20B can absorb the pressure difference by being swollen or depressed according to the slight difference between the pressures of the inside and outside the casing 11. As a result, the difference between the pressures of the inside and outside the casing 11 can be adjusted, thereby making it possible to extend the life of the device 10.

(3) The intake port 12A is sealed by the pressure-adjusting gel-type member 20 from the outer side, and it is unnecessary to provide the pressure-adjusting gel-type member 20 inside the casing 11. Therefore, the size of the casing 11 can be reduced.

(4) The intake port 12A is sealed by the pressure-adjusting gel-type member 20, the screw holes 13A, 13A are sealed by the sealing gel-type members 21, 21, and the gasket 17 is sealed by the sealing member 22, so that all the gaps of the casing 11 are covered. Thus, intrusion of the humidity from the outside can be prevented. As a result, the humidity inside the casing 11 can be maintained to the initial manufacture humidity over a long term, thereby making it possible to extend the life of the device 10.

The hard disk drive device of the present invention is formed in the manner described above, so that following effects can be achieved as exemplary advantages according to the invention.

That is, the intake port is sealed by the pressure-adjusting gel-type member from the outer side, and the humidity intruding from the intake port can be prevented thereby. Therefore, the humidity inside the device can be maintained to the initial manufacture humidity over a long term.

Further, the intake port is sealed by the pressure-adjusting gel-type member from the outer side, and the pressure-adjusting gel-type member has flexibility. Thus, the pressure-adjusting gel-type member can absorb the difference between the pressures by being swollen or depressed according to the difference between the pressures of the inside and outside the device. As a result, the difference between the pressures of the inside and outside the device can be adjusted, thereby making it possible to extend the life of the device.

Furthermore, the intake port is sealed by the pressure-adjusting gel-type member from the outer side, and the pressure-adjusting gel-type member is not required to be provided inside the casing. Therefore, it is possible to reduce the size of the casing.

Moreover, the pressure-adjusting gel-type member is provided by being glued through utilizing the viscosity of itself, so that it is easy to be attached and detached to/from the casing. As a result, the pressure-adjusting gel-type member can be used repeatedly.

Next, a second exemplary embodiment of the device 10 according to the present invention will be described by referring to FIG. 3-FIG. 5.

In the second exemplary embodiment, same reference numerals are applied to the same members as the structural members of the first exemplary embodiment, and only different aspects are to be described in details while omitting or simplifying the detailed explanations of the same members.

The second exemplary embodiment is designed to house a casing 11 containing a magnetic disk 15 and a magnetic head 16 inside thereof into a loading carrier 30 through supporting it by a spring mechanism 31 that is interposed between the loading carrier 30 and the casing 11, when housing the device 10 of the first exemplary embodiment to the loading carrier 30 used for housing.

Figure 3:
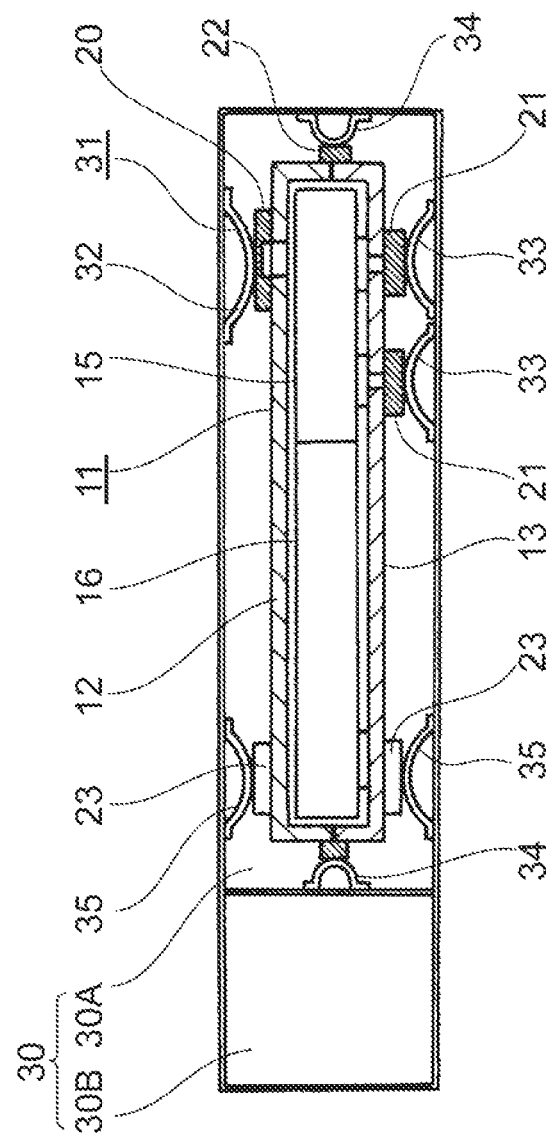
FIG. 3 is a longitudinal section showing a second exemplary embodiment of the hard disk drive device according to the present invention.

That is, as shown in FIG. 3, the loading carrier 30 is formed as a box shape of a size in which a plurality of the devices 10 can be placed in the direction orthogonal to the paper face of FIG. 3. The loading carrier 30 is separated into a large space 30A and a small space 30B. The device 10 is housed in the large space 30A out of those spaces. The device 10 is supported by the spring mechanism 31 as described above.

Each of a plurality of spring members of the spring mechanism 31 is fixed to the inner-side face of the loading carrier 30. The springe members are: a pressure-part spring member 32 corresponding to the pressure-adjusting gel-type member 20 for sealing the intake port 12A; screw-hole-part spring members 33, 33 corresponding to the sealing gel-type members 21, 21 for sealing the screw holes 13A, 13A; gasket-part spring members 34, 34 corresponding to the sealing gel-type member 22 for sealing the gasket part 17; and balance spring members 35, 35 corresponding to balancing gel-type members 23, 23.

Note here that the balancing gel-type members 23, 23 are provided in advance on the top face of the upper housing 12 and the bottom face of the lower housing 13 at the positions on the opposite sides of the sealing gel-type members 21, 21 used for sealing the screw holes 13A, 13A of the device 10.

The material of the balancing gel-type members 23, 23 may not necessarily have to be a gel type but may be a plastic type such as polyvinyl chloride.

Each of the spring members 32, 33, 34, and 35 is formed with a plate spring having a semicircular shape in its sectional view, and flange parts in both ends of each of the spring members 32, 33, 34, and 35 are fixed to the inner-side face of the loading carrier 30 by spot welding or the like.

Figure 4:
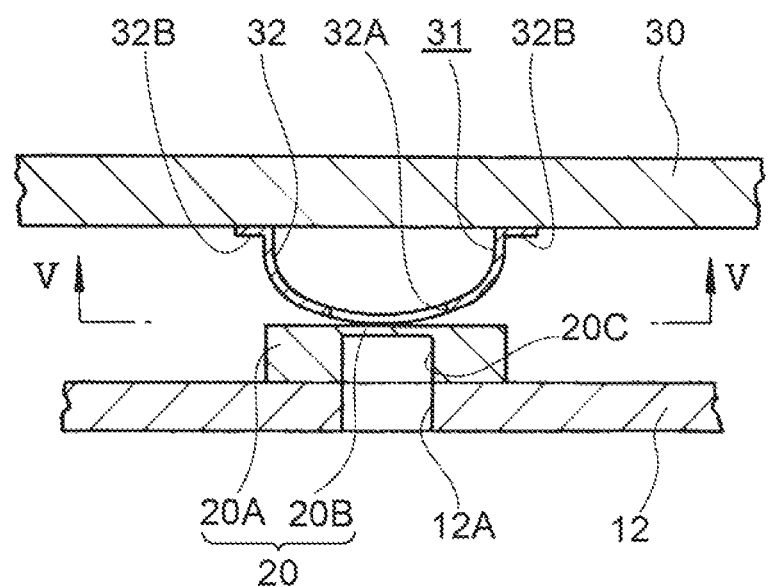
FIG. 4 is a longitudinal section showing a relation between a pressure-adjusting gel-type member and a spring mechanism according to the second exemplary embodiment.
Figure 5:
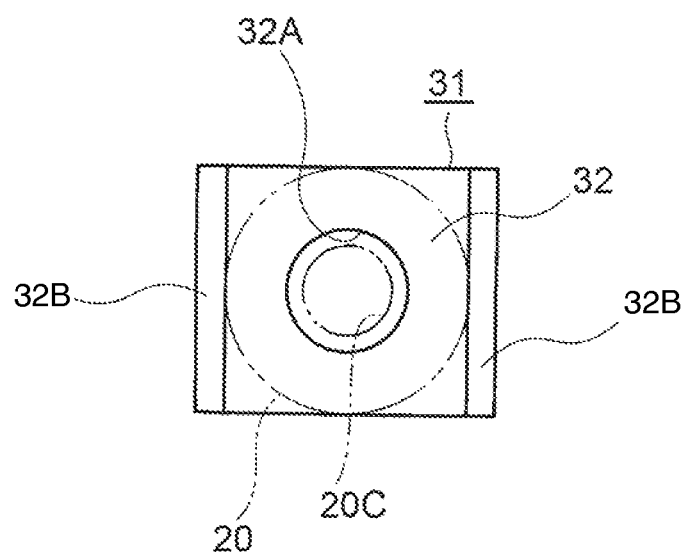
FIG. 5 is a perspective view taken along the V-V line sown in FIG. 4.

In the pressure-part spring member 32 corresponding to the pressure-adjusting gel-type member 20, a round hole 32A corresponding to the thin-plate pressure adjusting part 20B of the pressure-adjusting gel-type member 20 is formed in the center part of the tip arc that is in contact with the pressure-adjusting gel-type member 20 as shown in FIG. 4 and FIG. 5 in details. Thus, the round hole 32A does not interfere with the movements of the pressure-adjusting part 20B of the pressure-adjusting gel-type member 20 which is swollen or depressed according to the difference in the pressures of the inside and outside the device 10.

Further, such pressure-part spring member 32 is fixed to the inner-side face of the loading carrier 30 via the flange parts 32B thereof on both sides by spot welding or the like.

Regarding the spring members 33, 34, 35 corresponding to the other sealing gel-type members 21, 22, and the balancing gel-type member 23, respectively, each tip part thereof is provided by being in contact with the external surface of the sealing gel-type members 21, 22, and the balancing gel-type member 23. Further, a plurality of the spring members 34 are provided on the circumference of the sealing gel-type member 22 at a prescribed interval.

Thus, even when there is a shaking move generated to the device 10 inside the loading carrier 30 due to oscillations or the like, the oscillations are absorbed by the spring property of the spring members 33 and the like as well as the flexibility of the sealing spring members 21 and the like. Therefore, it is possible to prevent the bad influence imposed inside the device 10.

The balancing gel-type members 23, 23 may not have to be provided. Instead, the positions thereof may be supported directly by the spring member 35.

With the second exemplary embodiment structured in the manner described above, following effects can be achieved in addition to substantially the same effects as the effects (1) to (4) described above.

(5) The pressure-adjusting gel-type member 20 is press-supported by the pressure-part spring member 32, the sealing gel-type member 21 is press-supported by the screw-hole-part spring member 33, the sealing gel-type member 22 is press-supported by the gasket-part spring member 34, and the balancing gel-type member 23 is press-supported by the balancing-part spring member 35. Therefore, even when there is a shaking move generated to the device 10 inside the loading carrier 30 due to oscillations or the like, the oscillations are absorbed by the spring property of the spring members 32 and the like as well as the flexibility of the pressure-adjusting gel-type member 20 and the like. Therefore, it is possible to prevent the bad influence imposed inside the device 10.

(6) The round hole 32A corresponding to the thin-plate pressure adjusting part 20B of the pressure-adjusting gel-type member 20 is formed in the center part of the tip arc that is in contact with the pressure-adjusting gel-type member 20, thereby making it possible to allow the move of the pressure adjusting part 20B such as being swollen or depressed according to the difference between the pressures of the inside and outside the casing 11. As a result, even when the device 10 is housed inside the loading carrier 30, it is possible to absorb the difference between the pressures of the inside and outside the casing 11.

While the present invention has been described above by referring to each of the exemplary embodiments, the present invention is not limited only to each of those exemplary embodiments. Various kinds of modifications can be added to the structures and details of the present invention. Further, it is to be noted that the present invention includes forms acquired by properly combining a part or a whole part of the structures of each of the exemplary embodiments.

For example, the inside diameter part 20C of the recessed part of the pressure-adjusting gel-type member 20 in the first exemplary embodiment is formed substantially in a same size as the inside diameter of the intake port 12A provided to the upper housing 12. However, the present invention is not limited only to such case. The inside diameter part 20C of the recessed part of the pressure-adjusting gel-type member 20 may be formed larger than the inside diameter of the intake port 12A.

With this, a still larger difference between the pressures can be absorbed, so that adjustment of the inside pressure can be done more securely. This makes it possible to deal with various kinds of environments more flexibly and securely.

For example, each of the spring members 32 to 35 constituting the spring mechanism 31 in the second exemplary embodiment is formed by a plate spring having a semicircular shape in its sectional view. However, the present invention is not limited only to such case. It is also possible to employ a structure in which each of the gel-type members 20 to 23 is supported by a coil spring.

With such structure, it is also possible to achieve substantially the same effect as that of (6) described above.

The new technical contents of each of the above-described exemplary embodiments can be summarized as follows. While a part or a whole part of the exemplary embodiments can be depicted as follows, it is to be noted that the present invention is not necessarily limited to those depicted below.

(Supplementary Note 1)

A hard disk drive device, including: a casing formed by an upper housing and a lower housing; and a magnetic disk as well as a magnetic head housed inside the casing, wherein an intake port for adjusting a difference between pressures of inside and outside the casing is provided to either the upper housing or the lower housing, and the intake port is sealed by a pressure-adjusting gel-type member from outer side.

(Supplementary Note 2)

The hard disk drive device as depicted in Supplementary Note 1, wherein: the pressure-adjusting gel-type member is formed into a recessed shape in its sectional view with a recessed part provided inside thereof, and the pressure-adjusting gel-type member is placed to cover over the intake port with the recessed part; and the recessed shape is formed by a thick-plate circumference fixing part that is fixed to a circumference of a fringe part of the intake port and a thin-plate pressure-adjusting part formed on one end of the circumference fixing part.

(Supplementary Note 3)

The hard disk drive device as depicted in Supplementary Note 1 or 2, wherein: inside diameter of the recessed part inside the pressure-adjusting gel-type member is formed larger than inside diameter of the intake port at least.

(Supplementary Note 4)

The hard disk drive device as depicted in any one of Supplementary Notes 1 to 3, wherein: fixing screw holes for fixing the magnetic disk and the magnetic head inside the casing are provided to one of the housings, and a sealing gasket is provided to a contact face between the upper housing and the lower housing; and gaps in the screw holes and in the gasket are sealed by a sealing gel-type member, respectively.

(Supplementary Note 5)

The hard disk drive device as depicted in any one of Supplementary Notes 1 to 4, wherein: when loaded to a housing loading carrier, the casing in which the magnetic disk and the magnetic head are housed is supported by a spring mechanism that is provided to the loading carrier.

(Supplementary Note 6)

The hard disk drive device as depicted in Supplementary Note 5, wherein the spring mechanism comprises: a pressure-part spring member for press-supporting the pressure-adjusting gel-type member; a screw-hole-part spring member for press-supporting the sealing gel-type member which corresponds to the screw hole; and a gasket-part spring member for press-supporting the sealing gel-type member which corresponds to the gasket.

(Supplementary Note 7)

The hard disk drive device as depicted in Supplementary Note 6, wherein: the pressure-part spring member is formed by a plate spring having a semicircular shape in its sectional view, and a clearance hole that is larger than the inside diameter of the recessed part of the pressure adjusting part of the pressure-adjusting gel-type member is formed in a tip arc part which is in contact with the pressure-adjusting gel-type member.

(Supplementary Note 8)

The hard disk drive device as depicted in Supplementary Note 5 or 6, wherein: a plurality of balancing gel-type members are provided on circumference faces of the upper housing and the lower housing by being balanced with the pressure-adjusting gel-type member, the sealing gel-type member of the screw hole part, and the sealing gel-type member of the gasket part; and balance-part spring members for press-supporting the plurality of balancing gel-type members, respectively, are provided to the loading carrier.

INDUSTRIAL APPLICABILITY

The hard disk drive device of the present invention can be utilized as a small-size storage device for a computer, for example.

What is claimed is:

1. A hard disk drive device, comprising: a casing formed by an upper housing and a lower housing; and a magnetic disk as well as a magnetic head housed inside the casing, wherein
   an intake port for adjusting a difference between pressures of inside and outside the casing is provided to either the upper housing or the lower housing, and the intake port is sealed by a pressure-adjusting gel-type member from an outer side,
   the pressure-adjusting gel-type member is formed by a single columnar-member, and includes a recessed part inside thereof, an inside diameter of the recessed part being formed to be in the same size as an inside diameter of the intake part, and
   the pressure-adjusting gel-type member is put on an outer side of the casing with the recessed part being aligned with the intake port.

2. The hard disk drive device as claimed in claim 1, wherein:
   a part of the pressure-adjusting gel-type member constituting a ceiling of the recessed part serves as a pressure-adjusting part that changes its shape in response to a difference between pressures inside and outside the casing.

3. A loading carrier comprising a hard disk drive device as claimed in claim 1, which is housed inside the loading carrier, and a spring mechanism that is provided to the loading carrier to support the hard disk drive device.

4. The hard disk drive device as claimed in claim 1, wherein:
   fixing screw holes for fixing the magnetic disk and the magnetic head inside the casing are provided to one of the housings, and a sealing gasket is provided to a contact face between the upper housing and the lower housing; and
   gaps in the screw holes and in the gasket are sealed by a sealing gel-type member, respectively.

5. A loading carrier comprising a hard disk drive device as claimed in claim 4, which is housed inside the loading carrier, and a spring mechanism that is provided to the loading carrier to support the hard disk drive device.

6. The loading carrier as claimed in claim 5, wherein
   the spring mechanism comprises: a pressure-part spring member for press-supporting the pressure-adjusting gel-type member; a screw-hole-part spring member for press-supporting the sealing gel-type member which corresponds to the screw hole; and a gasket-part spring member for press-supporting the sealing gel-type member which corresponds to the gasket.

7. The loading carrier as claimed in claim 6, wherein:
   the pressure-part spring member is formed by a plate spring having a semicircular shape in its sectional view, and a clearance hole that is larger than the inside diameter of the recessed part of a pressure adjusting part of the pressure-adjusting gel-type member is formed in a tip arc part which is in contact with the pressure-adjusting gel-type member.

8. The loading carrier as claimed in claim 6, wherein: a plurality of balancing gel-type members are provided on circumference faces of the upper housing and the lower housing by being balanced with the pressure-adjusting gel-type member, the sealing gel-type member of the screw hole part, and the sealing gel-type member of the gasket part; and
   balance-part spring members for press-supporting the plurality of balancing gel-type members, respectively, are provided to the loading carrier.

\* \* \* \* \*